(12) United States Patent
DeLapp et al.

(10) Patent No.: US 12,669,711 B2
(45) Date of Patent: Jun. 30, 2026

(54) SYSTEMS AND METHODS FOR OPTICAL ALIGNMENT OF DISPLAY MODULES IN A HEAD-MOUNTED DEVICE

(71) Applicant: Apple Inc., Cupertino, CA (US)

(72) Inventors: Scott M. DeLapp, San Diego, CA (US); Vikrant Bhakta, Santa Clara, CA (US); Hyungryul Choi, San Jose, CA (US); Guolin Peng, Sunnyvale, CA (US); Di Hu, Mountain View, CA (US)

( * ) Notice: Subject to any disclaimer, the term of this patent is extended or adjusted under 35 U.S.C. 154(b) by 140 days.

(21) Appl. No.: 18/488,865

(22) Filed: Oct. 17, 2023

(65) Prior Publication Data

US 2024/0393591 A1 Nov. 28, 2024

Related U.S. Application Data

(63) Continuation of application No. 18/253,913, filed as application No. PCT/US2021/060630 on Nov. 23, 2021, now abandoned.

(Continued)

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0036* (2013.01);
(Continued)

(58) Field of Classification Search
CPC .............. G02B 27/0172; G02B 6/0016; G02B 6/0036; G02B 26/0875; G02B 27/0176;
(Continued)

(56) References Cited

U.S. PATENT DOCUMENTS 7,414,792 B2 8/2008 Domjan et al.
8,705,177 B1 4/2014 Miao
(Continued)

FOREIGN PATENT DOCUMENTS

DE 102019205138 A1 * 10/2019 ......... G02B 26/0816
WO WO-2018194962 A1 * 10/2018 ........... G02B 6/4215

*Primary Examiner* — David D Davis
(74) *Attorney, Agent, or Firm* — Treyz Law Group, P.C.; Michael H. Lyons; Jinie M. Guihan

(57) ABSTRACT

A display device may include first and second display modules that provide image light to first and second waveguides. The waveguides may direct the image light to first and second eye boxes. Each display module may include optics mounted to a housing and mechanical alignment structures that mechanically adjust the position of an optical axis of the optics. The alignment structures may rotate the entire housing, may mechanically translate the optics, may adjust the position of a spatial light modulator within the module, and/or control circuitry may change a subset of pixels used by the modulator to compensate for optical misalignment between the first and second eye boxes. The device may include optical misalignment sensors that detect the optical misalignment. The control circuitry may compensate for the optical misalignment as detected by the optical misalignment sensors.

11 Claims, 11 Drawing Sheets

Related U.S. Application Data

(60) Provisional application No. 63/119,507, filed on Nov. 30, 2020.

(51) Int. Cl.

| | |
|---|---|
| *G02B 26/08* | (2006.01) |
| *G02B 27/09* | (2006.01) |
| *G02B 27/14* | (2006.01) |

(52) U.S. Cl.
CPC ..... *G02B 26/0875* (2013.01); *G02B 27/0176* (2013.01); *G02B 27/0179* (2013.01); *G02B 27/0955* (2013.01); *G02B 27/0977* (2013.01); *G02B 27/144* (2013.01); *G02B 2027/0138* (2013.01); *G02B 2027/014* (2013.01); *G02B 2027/0163* (2013.01)

(58) Field of Classification Search
CPC ............ G02B 27/0179; G02B 27/0955; G02B 27/0977; G02B 27/144; G02B 2027/0138; G02B 2027/014; G02B 2027/0163; G02B 27/0081

See application file for complete search history.

(56) References Cited

U.S. PATENT DOCUMENTS

| | | | | |
|---|---|---|---|---|
| 8,792,175 | B2 | 7/2014 | Fujishiro | |
| 9,753,286 | B2 | 9/2017 | Gao et al. | |
| 10,254,542 | B2 * | 4/2019 | Kollin | G03B 21/2066 |
| 10,571,692 | B2 | 2/2020 | Geng et al. | |
| 10,670,808 | B1 | 6/2020 | Trail | |
| 2013/0169683 | A1 * | 7/2013 | Perez | G06F 21/32 |
| | | | | 382/117 |
| 2017/0102548 | A1 | 4/2017 | Tremblay et al. | |
| 2018/0041739 | A1 | 2/2018 | Otani | |
| 2018/0292654 | A1 * | 10/2018 | Wall | H04N 9/315 |
| 2020/0174255 | A1 | 6/2020 | Hollands et al. | |
| 2020/0233213 | A1 | 7/2020 | Porter | |
| 2020/0278538 | A1 * | 9/2020 | Taylor | G02B 27/0172 |
| 2020/0371357 | A1 | 11/2020 | Choi | |

* cited by examiner

SYSTEMS AND METHODS FOR OPTICAL ALIGNMENT OF DISPLAY MODULES IN A HEAD-MOUNTED DEVICE

This application is a continuation of U.S. patent application Ser. No. 18/253,913, filed May 22, 2023, which is a national stage application filed under 35 U.S.C. § 371 of International Patent Application No. PCT/US2021/060630, filed Nov. 23, 2021, which claims priority to U.S. Provisional Patent Application No. 63/119,507, filed Nov. 30, 2020, all of which are hereby incorporated by reference herein in their entireties.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The device may include first and second display modules. The first and second display modules may provide image light to respective first and second waveguides. The first and second waveguides may direct the image light to first and second eye boxes. Each display module may include collimating optics mounted to a display module housing. The collimating optics may transmit the image light along an optical axis. The display module may include mechanical alignment structures that mechanically adjust a position of the optical axis with respect to the corresponding waveguide.

For example, the mechanical alignment structures may rotate the entire display module housing to rotate the optical axis about at least one axis. The mechanical alignment structures may additionally or alternatively include piezo-driven flexure stages that mount the collimating optics to the display module housing. The piezo-driven flexure stages may mechanically translate the collimating optics and thus the optical axis with respect to the display module housing (e.g., about one or two axes). The mechanical alignment structures may additionally or alternatively adjust the position and/or orientation of a spatial light modulator within the display module housing. These mechanical adjustments to the optical axis may serve to compensate for optical misalignment between the first and second eye boxes, thereby ensuring that a user is able to experience satisfactory binocular vision while viewing the first and second eye boxes. The control circuitry may additionally or alternatively perform digital misalignment compensation by adjusting subsets of pixels in the spatial light modulator of one or both of the display modules that are used to produce the image light.

The control circuitry may perform optical misalignment compensation operations based on optical misalignment detected by optical misalignment sensors. The optical misalignment sensors may include at least one image sensor in a housing portion that couples the first waveguide to the second waveguide. The image sensor(s) may receive portions of the image light from the first and second display modules through the first and second waveguides. The image sensor(s) may generate image sensor data based on the received image light. The control circuitry may identify the optical misalignment based on the image sensor data. In another suitable arrangement, infrared emitters may emit infrared light to sets of retro-reflective gratings on or adjacent to the waveguides. The retro-reflective gratings may reflect the infrared light towards the user's face. Sets of optical sensors on or adjacent to the waveguides may generate voltages in response to the infrared light that has reflected off of the user's face. The control circuitry may estimate the optical misalignment based on the voltages.

DETAILED DESCRIPTION

Figure 1:
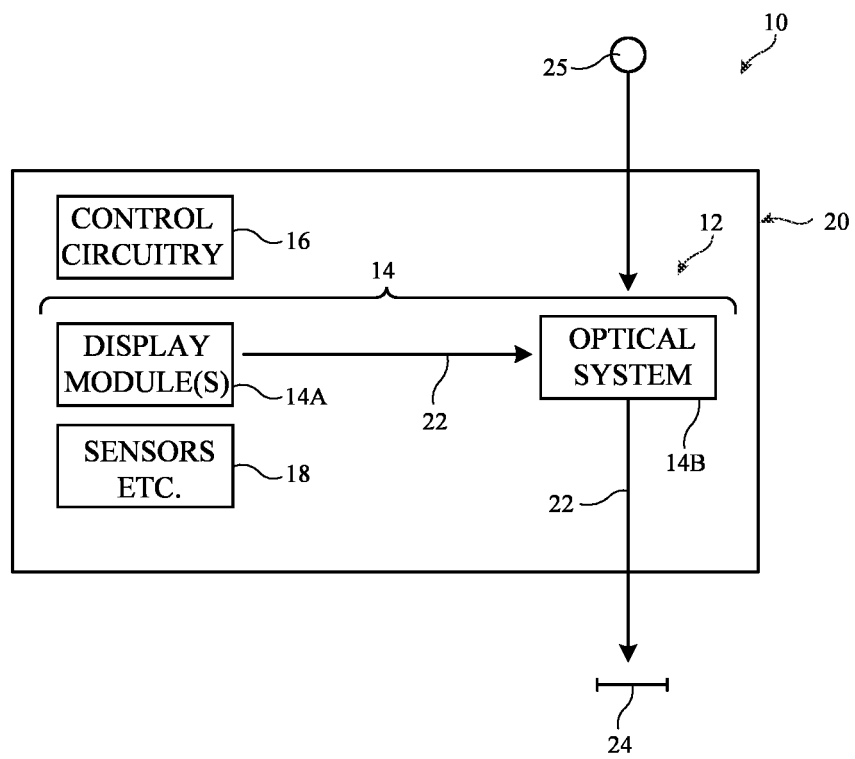
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., a supporting frame having left and right temple portions, left and right lens portions coupled between the temple portions, a nose bridge portion coupled between the left and right lens portions, etc.), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 that is redirected towards a user's eyes at eye box 24 using an associated one of optical systems 14B. Light 22 may sometimes be referred to herein as image light 22 (e.g., light that contains and/or represents something viewable such as a scene or object).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). If desired, components 18 may include gaze tracking sensors that gather gaze image data from a user's eye at eye box 24 to track the direction of the user's gaze in real time.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays, ferroelectric liquid crystal on silicon (fLCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. There may be at least two display modules 14A (e.g., within respective left and right temple portions of housing 20 or elsewhere) for producing image light that is provided to each respective optical system 14B. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
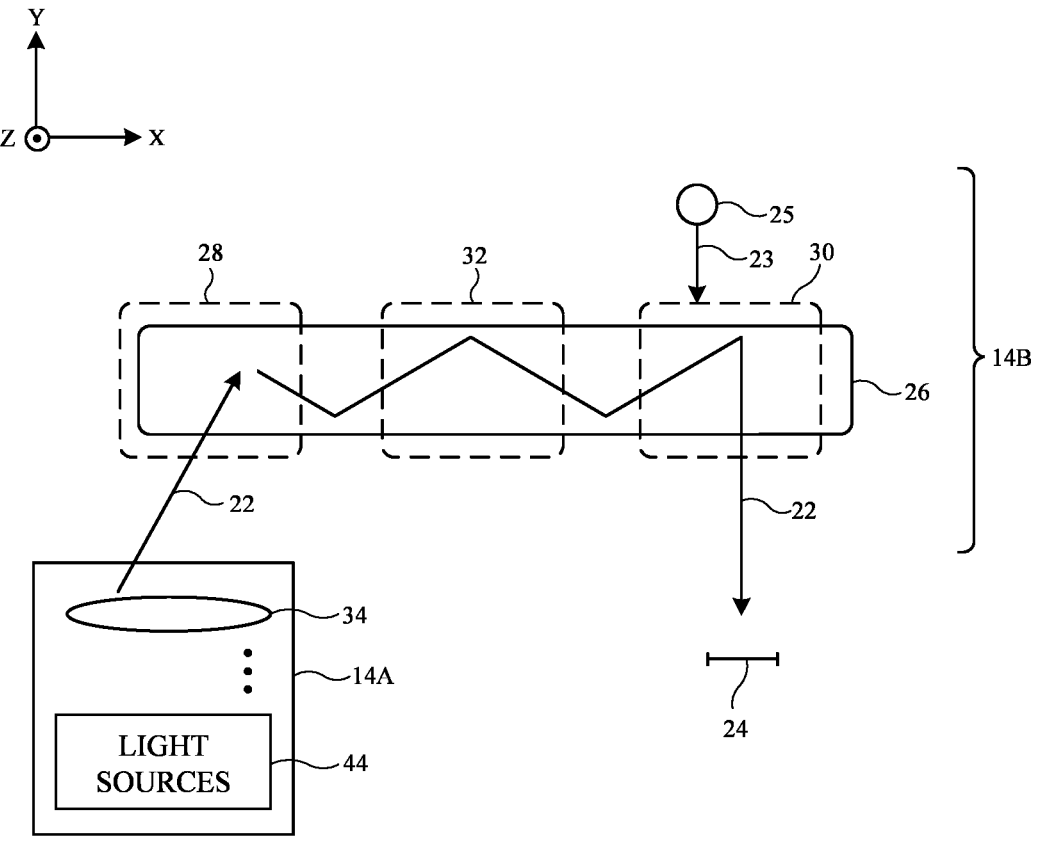
FIG. 2 is a top view of an illustrative optical system for a display having a display module that provides image light to a waveguide in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Display engine 14A may include collimating optics 34. Collimating optics 34 may sometimes be referred to herein as eyepiece 34, eyepiece lens elements 34, collimating lens 34, optics 34, or lens 34. Collimating optics 34 may include one or more lens elements that help direct image light 22 towards waveguide 26. Collimating optics 34 may be omitted if desired. Additional collimating optics may be optically interposed between display module 14A and waveguide 14B if desired (e.g., for helping to direct image light 22 towards the waveguide). I As shown in FIG. 2, display module 14A may generate image light 22 associated with image content to be displayed to (at) eye box 24. In the example of FIG. 2, display module 14A includes collimating optics 34 and light sources 44. Light sources 44 may produce image light 22 (e.g., in scenarios where display module 14A is an emissive display module, light sources 44 may include arrays of light emitters such as LEDs) or light sources 44 may produce illumination light that is provided to a spatial light modulator in display module 14A. The spatial light modulator may modulate the illumination light with image data to produce image light 22 (e.g., image light that includes images as identified by the image data). The spatial light modulator may be a transmissive spatial light modulator (e.g., may include a transmissive display panel such as a transmissive LCD panel) or a reflective spatial light modulator (e.g., may include a reflective display panel such as a DMD display panel, an LCOS display panel, an fLCOS display panel, etc.).

Image light 22 may be collimated using collimating optics 34. Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide image light 22 down its length via total internal reflection. Input coupler 28 may be configured to couple image light 22 from display module(s) 14A into waveguide 26, whereas output coupler 30 may be configured to couple image light 22 from within waveguide 26 to the exterior of waveguide 26 and towards eye box 24. Input coupler 28 may include an input coupling prism if desired. As an example, display module(s) 14A may emit image light 22 in the +Y direction towards optical system 14B. When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction). In scenarios where cross-coupler 32 is formed at waveguide 26, cross-coupler 32 may redirect image light 22 in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.). Any desired combination of holographic and reflective optics may be used to form couplers 28, 30, and 32.

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.), whereas input coupler 28 includes a prism mounted to an exterior surface of waveguide 26 (e.g., an exterior surface defined by a waveguide substrate that contacts the grating medium or the polymer layer used to form output coupler 30) or one or more layers of diffractive grating structures. This example is merely illustrative.

In the example of FIG. 2, only a single optical system 14B and a single display module 14A are shown for the sake of clarity. In practice, system 10 may include a first display module 14A that provides image light 22 to a first optical system 14B for display at a first eye box 24 (e.g., an eye box that is aligned with the left eye of a user) and may include a second display module 14A that provides image light 22 to a second optical system 14B for display at a second eye box 24 (e.g., an eye box that is aligned with the right eye of a user). For the sake of clarity, the operations of a single (e.g., first) display module 14A and a single (e.g., first) optical system 14B are described herein as an example.

The first display module 14A and the first optical system 14B may, for example, provide first image data (e.g., a stream of image frames for display at the user's left eye) to the first eye box. At the same time, the second display module 14A and the second optical system 14B provide second image data (e.g., a stream of image frames for display at the user's right eye and corresponding to the stream of image frames provided to the user's left eye by the first display module 14A and the first optical system 14B). In order to ensure proper binocular vision for the displayed image, the first display module 14A and the first optical system 14A need to be properly aligned with respect to the second display module 14B and the second optical system 14B. This optical alignment may, for example, be performed during manufacture, assembly, calibration, or testing of system 10 (e.g., in a manufacturing or assembly system). Such factory alignment may, for example, compensate for optical misalignment associated with the manufacturing tolerances for system 10. In addition, as system 10 is used by an end user, the display modules and optical systems can become misaligned with respect to each other over time (e.g., due to impact events, manufacturing tolerances, thermal effects, wear and tear, etc.).

Figure 3:
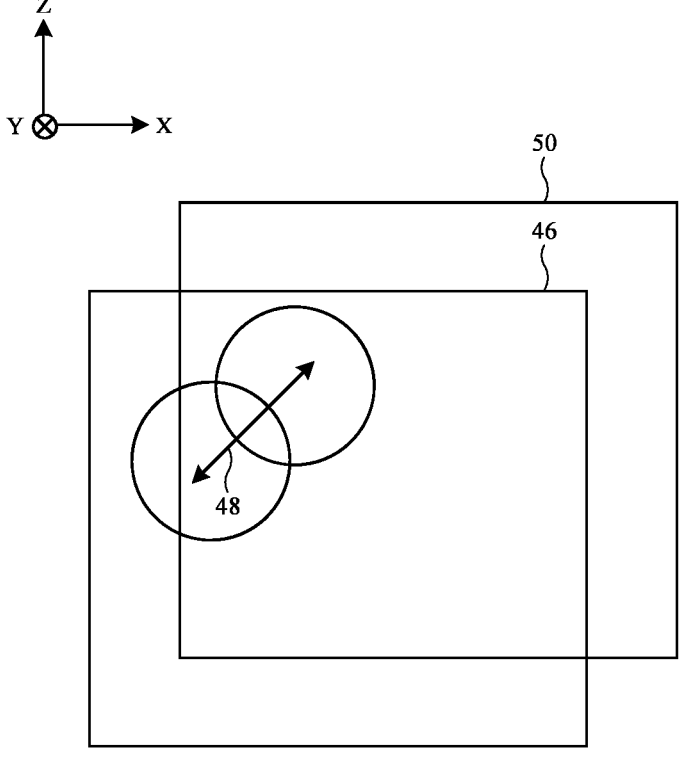
FIG. 3 is a diagram showing how images produced by first and second display modules can become misaligned in accordance with some embodiments.

If this optical misalignment goes uncorrected, the user may perceive undesired misalignment in the images provided to each of the eye boxes (e.g., the user may be unable to perceive the display images with satisfactory binocular vision). FIG. 3 is a diagram showing optical misalignment may be perceived by a user of system 3. As shown in FIG. 3, image 46 may be provided to a first eye box 24 (e.g., a left eye box that is aligned with the user's left eye) by a first (left) display module 14A and a first (left) optical system 14B. A corresponding image 50 may be provided to a second eye box 24 (e.g., a right eye box that is aligned with the user's right eye) by a second (right) display module 14A and a second (right) optical system 14B. When the first display module 14A and the first optical system 14B are properly aligned with the second display module 14A and the second optical system 14B, objects in images 46 and 50 may be properly displayed and viewed by the user. However, when the first display module 14A and the first optical system 14B are optically misaligned with the second display module 14A and the second optical system 14B, the objects in images 46 and 50 may be misaligned (e.g., by offset 48) and may thus appear unclear or disorienting to the user.

System 10 may perform optical alignment operations to ensure that proper optical alignment is maintained between the left and right eye boxes. The optical alignment operations may be performed during assembly/manufacture of system 10 and/or may be performed over time while system 10 is being used by an end user. In one suitable arrangement that is described herein as an example, each of the display modules 14A may include mechanical alignment structures that can be adjusted to ensure that the display modules are optically aligned.

Figure 4:
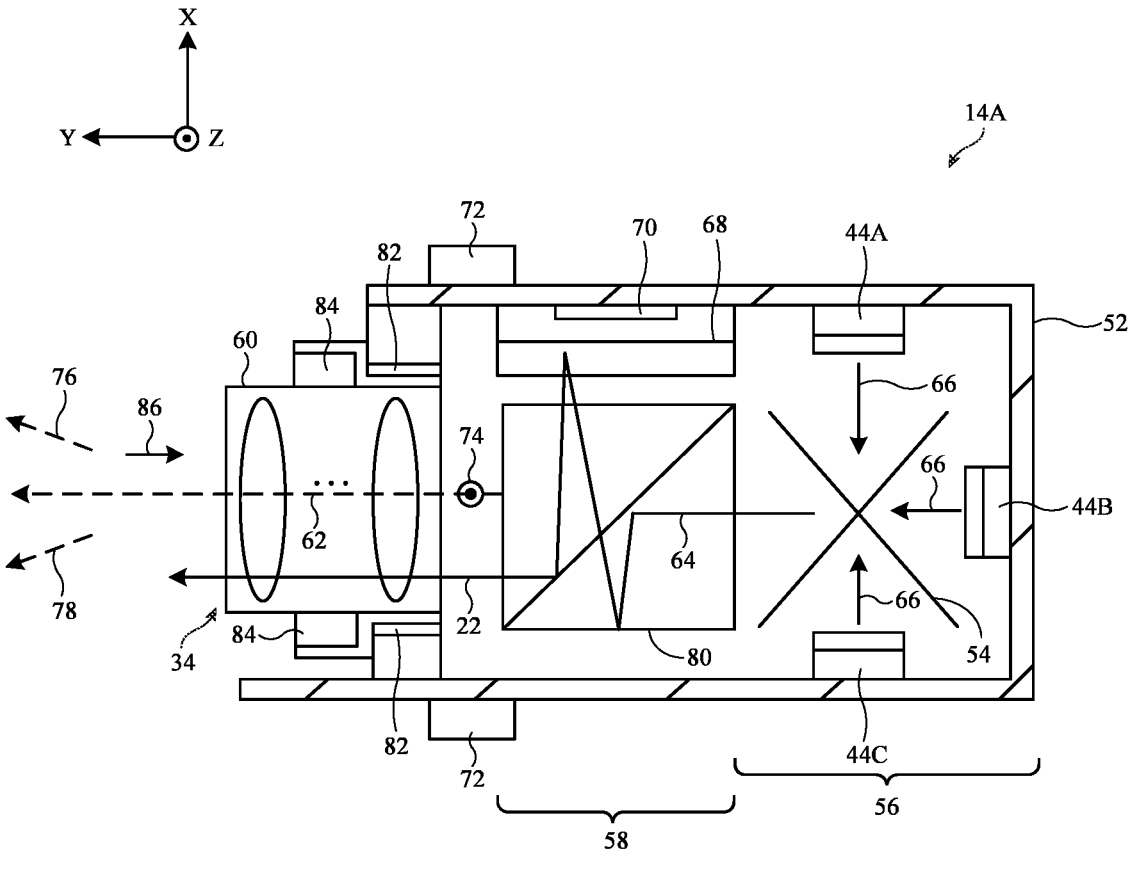
FIG. 4 is a cross-sectional side view of an illustrative display module that can compensate for optical misalignment with another display module in accordance with some embodiments.

FIG. 4 is a cross-sectional side view of a given display module 14A having mechanical alignment structures. Display module 14A of FIG. 4 may be used to form one or both of the display modules that provide image light to the left and right eye boxes of system 10. As shown in FIG. 4, display module 14A may include a display module housing 52 (sometimes referred to herein as display module chassis 52). In the example of FIG. 4, display module 14A includes a spatial light modulator 58 and illumination optics 56. This is merely illustrative and, in another suitable arrangement, display module 14A may be an emissive display module.

Illumination optics 56 and spatial light modulator 58 may be mounted within display module housing 52. Illumination optics 56 may provide illumination light 64 to spatial light modulator 58. Spatial light modulator 58 may modulate images onto illumination light 64 to produce image light 22. Image light 22 may be directed towards input coupler 28 of waveguide 26 (FIG. 2) by collimating optics 34. Collimating optics 34 may be mounted to display module housing 52 (e.g., at an open end of display module housing 52).

Illumination optics 56 may include light sources 44. Light sources 44 may include LEDs, OLEDs, uLEDs, lasers, etc. For example, as shown by arrows 66, illumination optics 56 may include a first light source 44A that emits illumination light of a first color (e.g., red illumination light), a second light source 44B that emits illumination light of a second color (e.g., green illumination light), and a third light source 44C that emits illumination light of a third color (e.g., blue illumination light). This example is merely illustrative. In general, each light source 44 may emit light of any desired color. Light source 44A may be replaced with an array of light sources, light source 44B may be replaced with an array of light sources, and/or light source 44C may be replaced with an array of light sources if desired. Illumination optics 56 may include more than three or fewer than three light sources 44 if desired.

Each light source 44 in illumination optics 56 may emit a respective portion of illumination light 64, as shown by arrows 66. Illumination optics 56 may include partially reflective structures such as X-plate 54 that combine the light emitted by each of the light sources 44 in illumination optics 56 into illumination light 64 (e.g., illumination light 64 may include red, green, and blue light emitted by the light sources 44A, 44B, and 44C). X-plate 54 may include a pair of partially reflective plates that reflect light of some wavelengths while transmitting light of other wavelengths, for example. If desired, X-plate 54 may be provided with optical wedges that help to support X-plate 54 (not shown in FIG. 4 for the sake of clarity). X-plate 54 may, for example, be formed from coatings or layers on surfaces of the optical wedges. In scenarios where optical wedges are provided in illumination optics 56 for supporting X-plate 54, the X-plate and wedges may sometimes be referred to collectively as a prism (e.g., prism 54).

Illumination light 64 may include the illumination light generated by light source 44A (e.g., red light), the illumination light generated by light source 44B (e.g., green light), and/or the illumination light generated by light source 44C (e.g., blue light). X-plate 54 may provide illumination light 64 to spatial light modulator 58. Lens elements (not shown in FIG. 3 for the sake of clarity) may be used to help direct illumination light 64 from illumination optics 56 to spatial light modulator 58 if desired.

Spatial light modulator 58 may include prism 80 and a reflective display panel such as display panel 68. Display panel 68 may be a DMD panel, an LCOS panel, an fLCOS panel, or other reflective display panel. Display panel 68 may, if desired, be mounted to display module housing 52. Prism 80 may direct illumination light 64 onto display panel 68 (e.g., different pixels on display panel 68). Control circuitry 16 (FIG. 1) may control display panel 68 to selectively reflect illumination light 64 at each pixel location to produce image light 22 (e.g., image light having an image as modulated onto the illumination light by display panel 68). Prism 80 may direct image light 22 toward collimating optics 34. Collimating optics 34 may direct image light 22 out of display module 14A and towards input coupler 28 (FIG. 2).

The position and/or orientation of display module 14A may be mechanically adjusted to ensure that the display module is optically aligned with the other display module 14A in system 10 (e.g., to mitigate optical misalignment between the display modules and optical systems that provide image light to the left and right eye boxes). If desired, mechanical alignment structures such as mechanical alignment structures 72 may be used to mechanically adjust the orientation of display module 14A itself. Mechanical alignment structures 72 may be electrically and/or mechanically actuated. Mechanical alignment structures 72 may be coupled to display module housing 52. Mechanical alignment structures 72 may rotate the entirety of display module housing 52 and thus display module 14A.

For example, mechanical alignment structures 72 may rotate display module housing 52 about one or more axes such as axis 74. This rotation may cause the optical axis 62 of collimating optics 34 to rotate about axis 74. For example, in a first setting, mechanical alignment structures 72 may orient display module 14A such that optical axis 62 points in the direction of arrow 78. In a second setting, mechanical alignment structures 72 may orient display module 14A such that optical axis 62 points in the direction of arrow 78. This example is merely illustrative. If desired, mechanical alignment structures 72 may rotate display module housing 52 about more than one axis and/or may perform mechanical translation of display module housing 52 (e.g., parallel to the X, Y, and/or Z axes of FIG. 4). This rotation may help to ensure that display module 14A is properly aligned for providing satisfactory binocular vision to the user.

If desired, mechanical alignment structures such as mechanical alignment structures 84 may mechanically adjust the position and/or orientation of collimating optics 34 with respect to the remainder of display module 14A (e.g., without adjusting the position or orientation of display module housing 52 or the other components housed within display module housing 52). Mechanical alignment structures 84 may include, for example, piezo-driven flexure stages. Mechanical alignment structures 84 may therefore sometimes be referred to herein as flexure stages 84. Collimating optics 34 may be mounted within eye piece housing 60 (sometimes referred to herein as eye piece barrel 60 or lens housing 60). Flexure stages 84 may be mounted to display module housing 52 using adhesive 82.

Flexure stages 84 may couple eye piece housing 60 to display module housing 52. Flexure stages 84 may receive control signals (e.g., from control circuitry 16 of FIG. 1) that cause flexure stages 84 to adjust the mechanical position of eye piece housing 60 and thus collimating optics 34 with respect to display module housing 52. For example, flexure stages 84 may serve to translate the position of eye piece housing 60 in a direction parallel to the X, Y, and/or Z axes of FIG. 4 relative to spatial light modulator 58. This mechanical translation may help to ensure that display module 14A is properly aligned for providing satisfactory binocular vision to the user.

If desired, the position and/or orientation of display panel 68 may be adjusted with respect to display module housing 52. For example, mechanical alignment structures such as mechanical alignment structures 70 may mechanically adjust the position and/or orientation of display panel 68 with respect to the remainder of display module 14A. This mechanical translation may help to ensure that display module 14A is properly aligned for providing satisfactory binocular vision to the user.

The example of FIG. 4 is merely illustrative. One, two, or all three of mechanical alignment structures 84, 70, and 72 may be used to perform optical alignment operations for display module 14A (e.g., mechanical alignment structures 84, 70, and/or 72 may be omitted). In scenarios where flexure stages 84 are omitted, eye piece housing 60 may be mounted to display module housing 54 using adhesive 82. If desired, display module 14A may additionally or alternatively perform digital alignment operations (e.g., alignment operations in which image data is provided to a subset of the area of the display panel to compensate for optical misalignment with the other display module in system 10). Mechanical alignment structures 72, 84, and 70 may be mechanically adjustable, electrically adjustable, electromechanically adjustable, etc. (e.g., mechanical alignment structures 72, 84, and 70 may include microelectromechanical systems (MEMS) structures, piezoelectric structures, actuators, or any other desired structures for adjusting the mechanical position of some or all of display module 14A).

Figure 5:
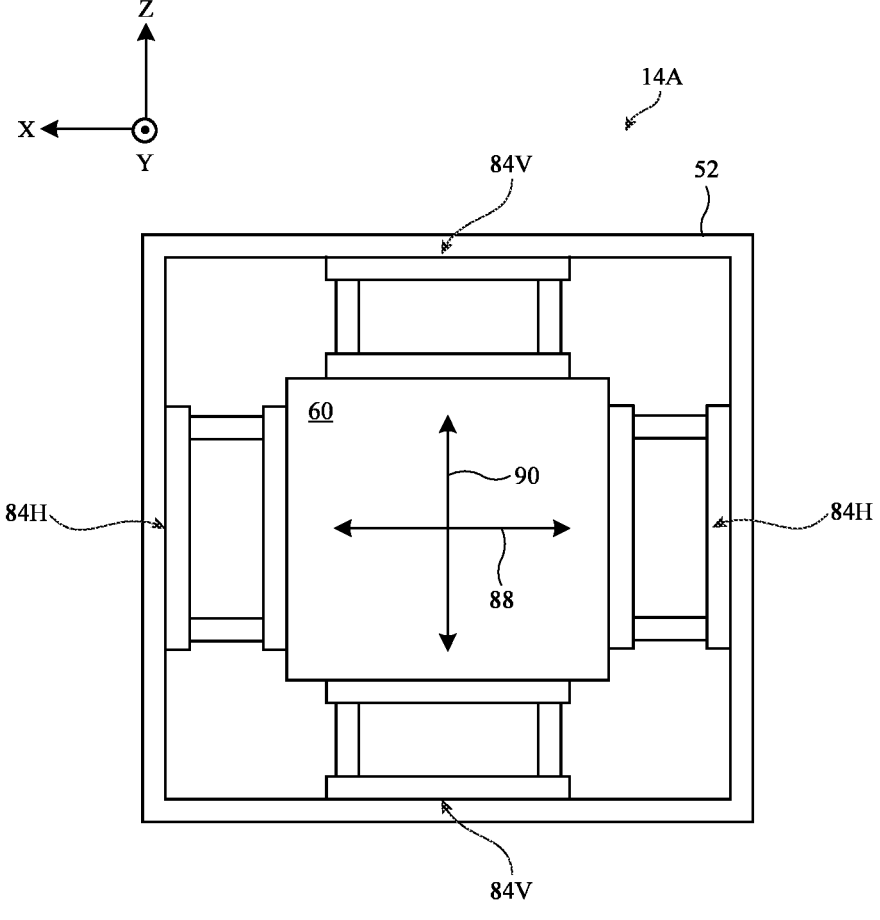
FIG. 5 is a front view of an illustrative display module of the type shown in FIG. 4 in accordance with some embodiments.

FIG. 5 is a front view (e.g., as taken in the direction of arrow 86 of FIG. 4) showing how flexure stages 84 may mechanically translate the position of eye piece housing 60 with respect to the remainder of display module 14A. As shown in FIG. 5, display module 14A may include a first pair of flexure stages 84H coupled to opposing first and second sides of eye piece housing 60. Display module 14A may additionally or alternatively include a second pair of flexure stages 84V coupled to opposing third and fourth sides of eye piece housing 60. Flexure stages 84H may translate the position of eye piece housing 60 relative to the rest of display module 14A in a first direction, as shown by arrow 88. Flexure stages 84V may translate the position of eye piece housing 60 relative to the rest of display module 14B in a second direction, as shown by arrow 90. Flexure stages 84H and 84V may therefore be used in conjunction to perform any desired two-dimensional translation of eye piece housing 60 for ensuring proper optical alignment with the other display module. Flexure stages 84H or flexure stages 84V may be omitted if desired. Other mechanical and/or electromechanical structures may be used to adjust the position and/or orientation of eye piece housing 60 if desired.

Figure 6:
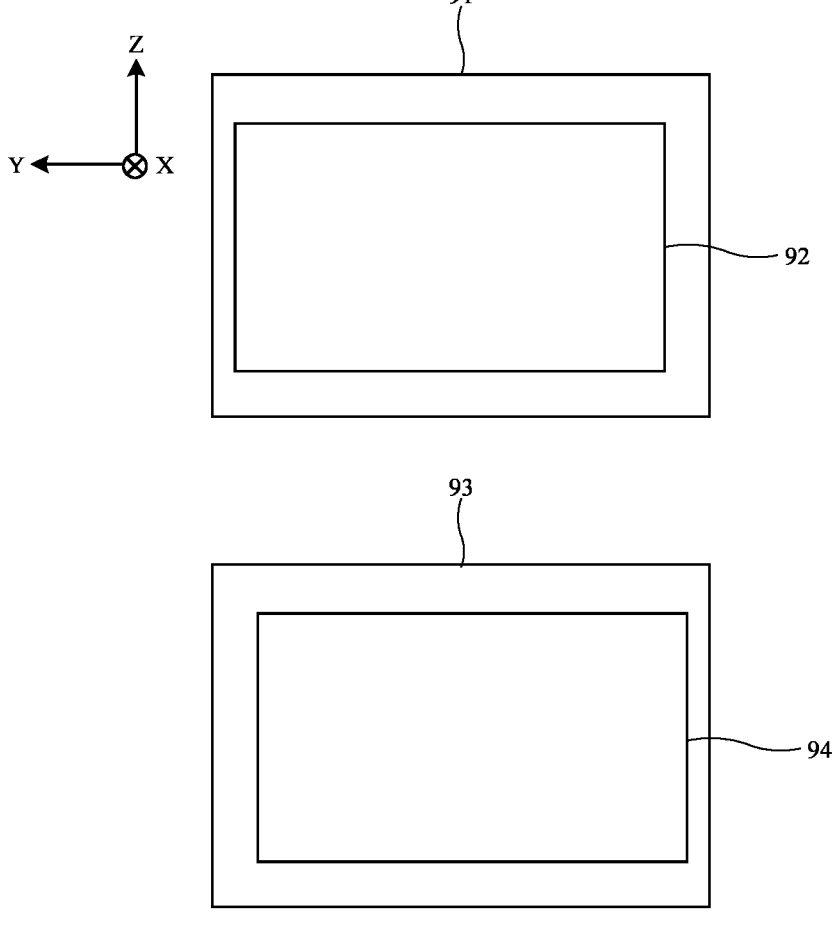
FIG. 6 is a diagram showing how first and second display modules may produce image data within different portions of a field of view to compensate for optical misalignment in accordance with some embodiments.

FIG. 6 is a diagram showing how display modules 14A may perform digital alignment operations. As shown in FIG. 6, control circuitry 16 may control the first display module 14A to produce image data 92 only within a first region of a corresponding field of view 91 (e.g., for display at the left eye box). Control circuitry 16 may control the second display module 14A to produce image data 94 only within a second region of a corresponding field of view 93 (e.g., for display at the right eye box). The position of image data 92 may be different from the position of image data 94 such that the difference in position compensates for the effects of optical misalignment between the left and right eye boxes. The positions of image data 92 and/or 94 may be changed over time to compensate for any change in misalignment that may occur.

Control circuitry 16 may control the position of image data 92 and image data 94 by providing image data for only a subset of the pixels in display panel 68 and/or by only providing illumination light 64 to that subset of pixels in display panel 68. As the optical misalignment changes over time, the subset of the pixels in display panel 68 may be changed so that the image light produced by the reflective display panel compensates for any changes in the optical misalignment. Performing digital alignment in this way may result in a smaller image at the eye boxes overall (e.g., because only a subset of the field of view of the reflective display panel is used at a given time to allow room for that subset to change over time). However, the improvement in perceived alignment between the left and right eye boxes may compensate for any such reduction in the size of the displayed images.

Display module 14A may only perform digital alignment (e.g., as shown in FIG. 6) or may perform digital alignment in addition to mechanical alignment using one or more of mechanical alignment structures 84, 70, and 72 of FIG. 4. The combination of one or more of these alignment techniques may help to ensure that proper optical alignment between the left and right eye boxes is maintained over time.

Figure 7:
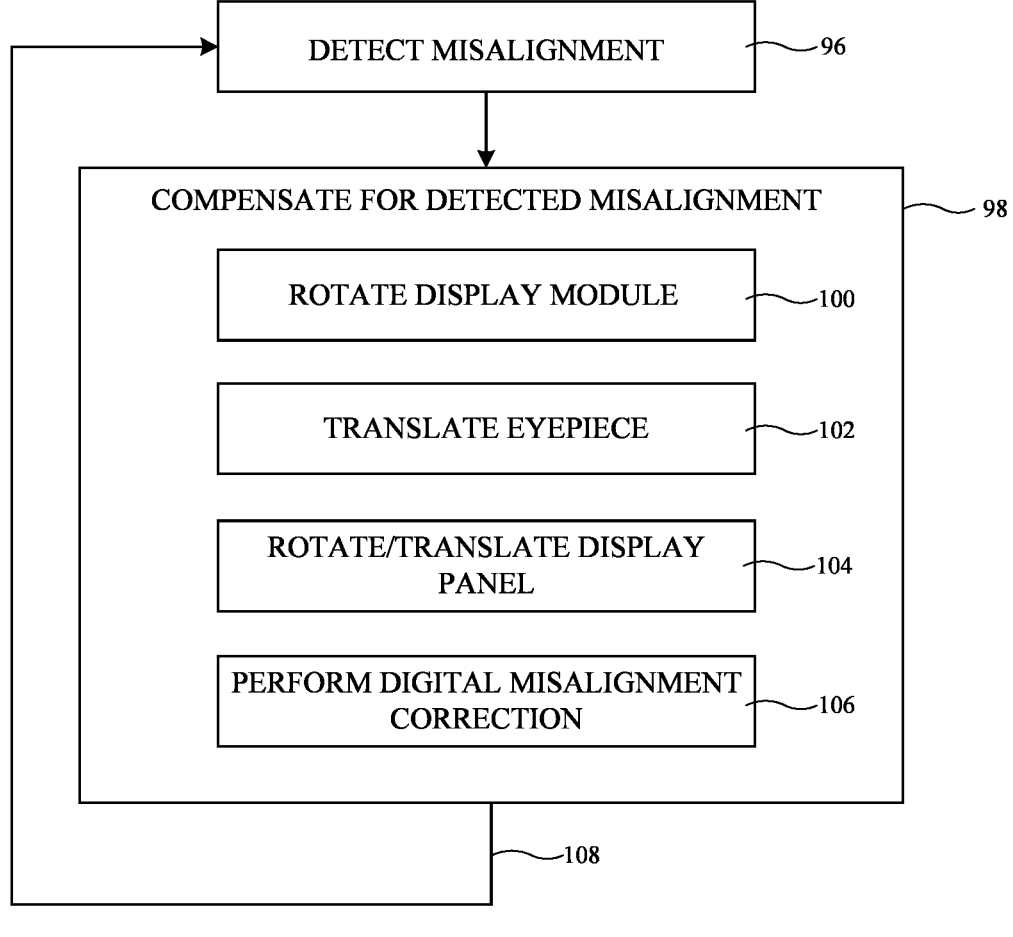
FIG. 7 is a flow chart of illustrative operations involved in compensating for optical misalignment in accordance with some embodiments.

FIG. 7 is a flow chart of illustrative operations that may be performed by system 10 to compensate for optical misalignment between the left and right eye boxes. These operations may be performed during assembly/manufacture of system 10 and/or during use of system 10 by an end user.

At operation 96, system 10 may detect optical misalignment between the left and right eye boxes. System 10 may detect both the presence and the amount/direction of optical misalignment if desired. For example, system 10 may include one or more optical misalignment sensors (sometimes referred to herein as optical alignment sensors). The optical misalignment sensors may monitor any optical misalignment between the left and right eye boxes. The optical misalignment sensors may detect the amount and/or direction of the misalignment if desired. In scenarios where the operations of FIG. 7 are performed during the assembly/manufacture of system 10, external optical misalignment sensors that are not a part of system 10 may be used to detect optical misalignment if desired.

At operation 98, system 10 may compensate for the optical misalignment detected between the left and right eye boxes (e.g., based on the optical misalignment as detected while processing operation 96). For example, system 10 may rotate the entirety of display module housing 52 and display module 14A using mechanical alignment structures 72 (at operation 100). System 10 may additionally or alternatively translate the position of eye piece housing 60 using flexure stages 84 (at operation 102). System 10 may additionally or alternatively translate and/or rotate the position of display panel 68 using mechanical alignment structures 70 (at operation 104). System 10 may additionally or alternatively perform digital misalignment correction by changing the portion of the field of view that is provided with image data between the left and right eye boxes, as shown in FIG. 6 (at operation 106 of FIG. 7).

System 10 may perform one, more than one, or all of operations 100, 102, 104, and 106 to compensate for the optical misalignment detected while processing operation 96. One or more of operations 100, 102, 104, and 106 may be omitted. The direction and/or magnitude of each adjustment as performed at steps 100, 102, 104, and 106 may be determined based on the direction and/or magnitude of the optical misalignment detected while processing operation 96, for example. In scenarios where the steps of FIG. 7 are being performed while system 10 is being used by an end user, processing may loop back to operation 96, as shown by path 108, to allow for updates in digital and/or mechanical alignment based on feedback from the optical misalignment detection. System 10 may thereby continuously or periodically monitor system 10 for any changes in optical alignment/misalignment between the left and right eye boxes so one or both of the corresponding display modules 14A can be adjusted to mitigate the changes in alignment/misalignment over time.

Figure 8:
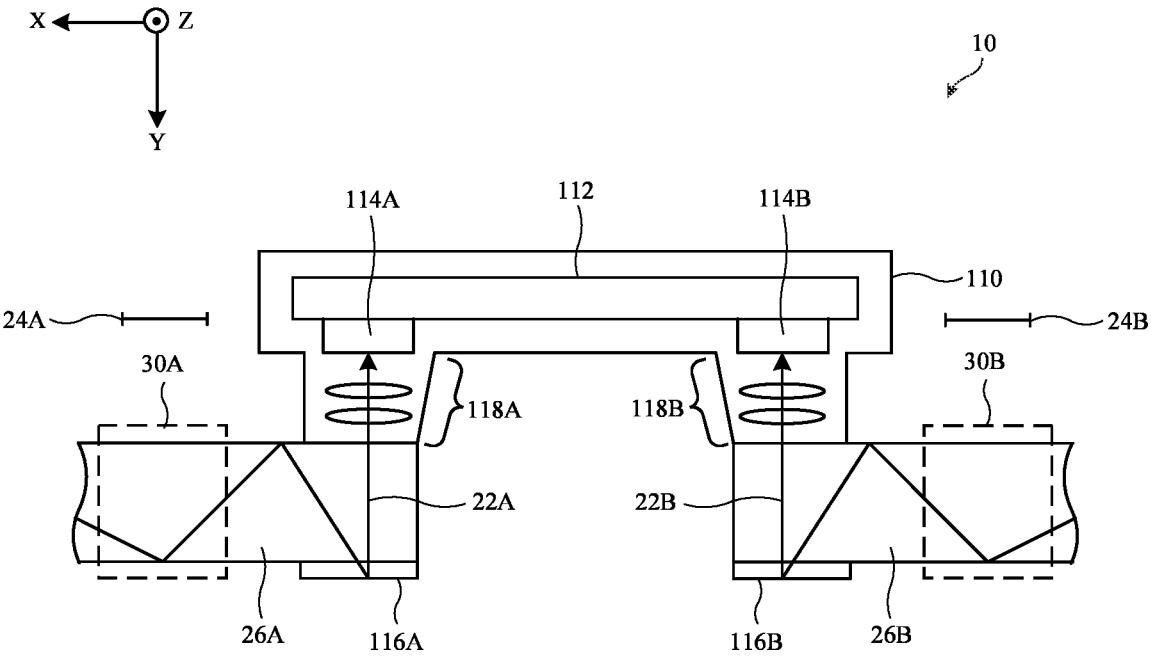
FIG. 8 is a cross-sectional top view of an illustrative optical misalignment detection module having two image sensors in accordance with some embodiments.

If desired, system 10 may include optical misalignment sensors for detecting optical misalignment between the left and right eye boxes (e.g., during processing of operation 96 of FIG. 7). In one suitable arrangement that is described herein as an example, the optical misalignment sensors may be integrated into an optical misalignment detection module. FIG. 8 is a cross-sectional top view showing how an optical misalignment detection module may be used to detect misalignment between the left and right eye boxes.

As shown in FIG. 8, system 10 may include an optical misalignment detection module 112. Optical misalignment detection module 112 may be integrated within a housing portion 110. Housing portion 110 may, for example, form a part of housing 20 of FIG. 1. In one suitable arrangement that is described herein as an example, housing portion 110 may be a nose bridge portion of housing 20. System 10 may include a first waveguide 26 such as waveguide 26A and may include a second waveguide 26 such as waveguide 26B. Housing portion 110 may couple waveguide 26A to waveguide 26B.

Waveguide 26B may receive image light 22B from a first display module 14A (e.g., image light containing image 46 of FIG. 3). Waveguide 26A may receive image light 22A from a second display module 14A (e.g., image light containing image 50 of FIG. 3). Waveguide 26B may have an output coupler 30B that couples a first portion of image light 22B out of waveguide 26B and towards a first eye box 24B (e.g., a left eye box). Output coupler 30B may pass a second portion of image light 22B without coupling or diffracting the second portion of image light 22B out of waveguide 26B. Waveguide 26B may include an additional output coupler 116B (e.g., a set of diffractive gratings, louvered mirrors, an output coupling prism, etc.). Output coupler 116B may couple the second portion of image light 22B out of waveguide 26B and into housing portion 110.

Similarly, waveguide 26A may have an output coupler 30A that couples a first portion of image light 22A out of waveguide 26A and towards a first eye box 24A (e.g., a right eye box). Output coupler 30A may pass a second portion of image light 22A without coupling or diffracting the second portion of image light 22A out of waveguide 26A. Waveguide 26A may include an additional output coupler 116A (e.g., a set of diffractive gratings, louvered mirrors, an output coupling prism, etc.). Output coupler 116A may couple the second portion of image light 22A out of waveguide 26A and into housing portion 110.

Optical misalignment detection module 112 may have a first image sensor 114A and a second image sensor 114B (e.g., CMOS image sensors, quad cell image sensors, other types of image sensors, etc.). Housing portion 110 may include lens elements 118A that direct the image light 22A from output coupler 116A towards image sensor 114A. Housing portion 110 may also include lens elements 118B that direct the image light 22B from output coupler 116B towards image sensor 114B. Image sensors 114A and 114B may gather image sensor data from image light 22A and 22B and may process the image sensor data to detect any optical misalignment between eye boxes 24A and 24B (e.g., control circuitry 16 may detect the optical misalignment associated with arrow 48 of FIG. 3 using image light 22A and 22B). This image data may be used to determine when and how to adjust one or both of the display modules 14A to compensate for the misalignment (e.g., while processing operation 98 of FIG. 7). As one example, a specific pixel in display panel 68 may be illuminated. The resultant image on image sensors 114A and 114B may then be used to compute relative misalignment between the left and right eye boxes. Relative clocking measurements may be made via multiple pixels.

Figure 9:
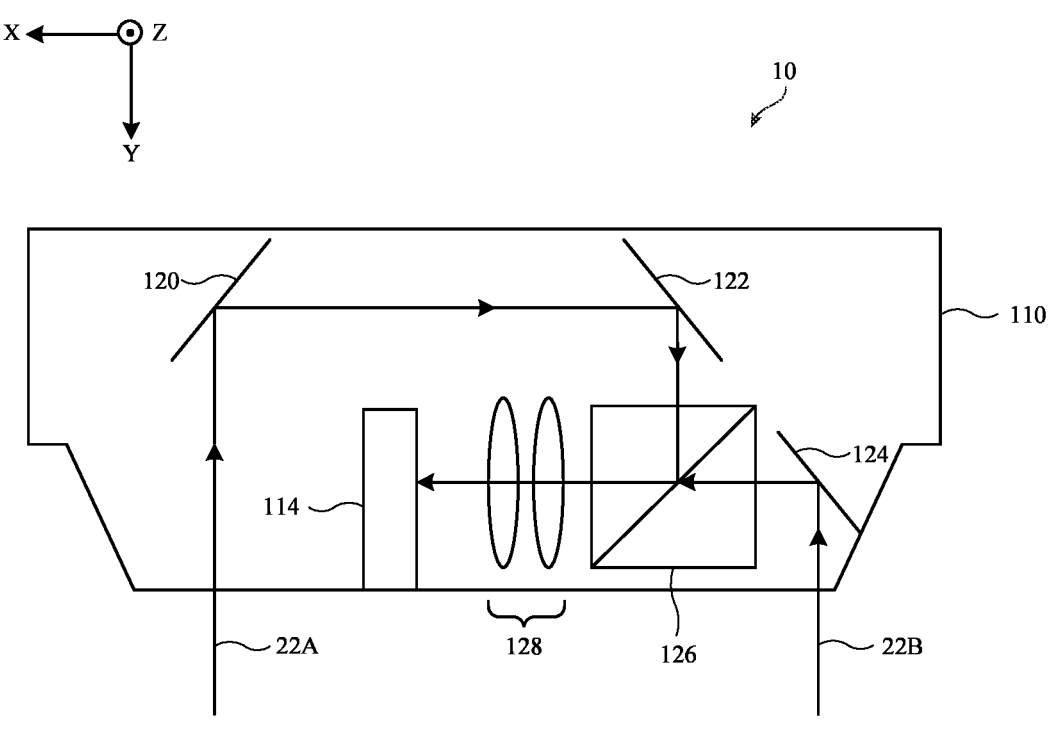
FIG. 9 is a cross-sectional top view of an illustrative optical misalignment detection module having one image sensor in accordance with some embodiments.

In the example of FIG. 8, housing portion 110 includes two image sensors for detecting optical misalignment between eye boxes 24A and 24B. This is merely illustrative. In another suitable arrangement, housing portion 110 may include a single image sensor for detecting optical misalignment between eye boxes 24A and 24B. FIG. 9 is a cross-sectional top view of housing portion 110 in one suitable example where housing portion 110 includes a single image sensor for detecting optical misalignment.

As shown in FIG. 9, housing portion 110 may include a first mirror 120, a second mirror 122, a third mirror 124, a partially reflective beam splitter 126, lens elements 128, and a single image sensor 114. Mirror 120 may receive image light 22A from output coupler 116A (FIG. 8) and may reflect image light 22A towards mirror 122. Mirror 122 may reflect image light 22A towards partially reflective beam splitter 126. At the same time, mirror 124 may receive image light 22B from output coupler 116B (FIG. 8) and may reflect image light 22B towards partially reflective beam splitter 126. Partially reflective beam splitter 126 may combine image light 22B and image light 22A and may provide the image light to image sensor 114 via lens elements 128. Image sensor 114 may gather image sensor data from the image light and may process the image sensor data to detect any optical misalignment between eye boxes 24A and 24B.

Figure 10:
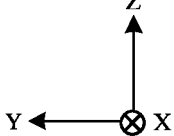
FIG. 10 is a diagram showing how compensating for optical misalignment can produce aligned images in accordance with some embodiments.
Figure 10:
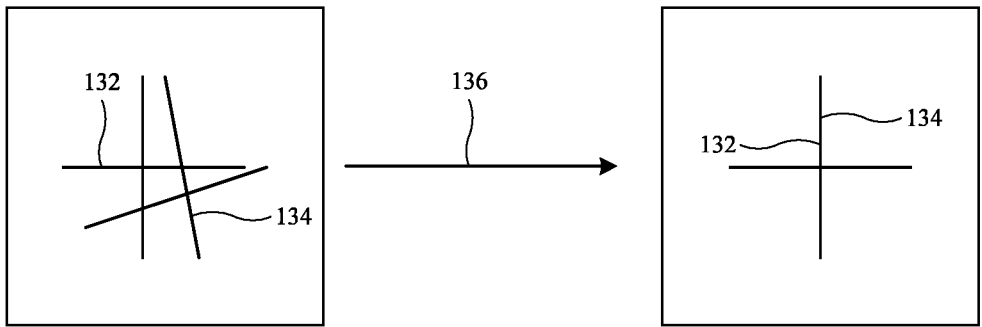

FIG. 10 is a diagram showing how system 10 may compensate for optical misalignment between the left and right eye boxes. As shown in FIG. 10, when optical misalignment is present, the image data 132 provided to one of the eye boxes (e.g., eye box 24A) will be misaligned with respect to the image data 134 provided to the other eye box (e.g., eye box 24B). System 10 may detect the presence, magnitude, and/or direction of this misalignment (e.g., while processing operation 96 of FIG. 7). By mechanically adjusting some or all of one or both of the display modules 14A (e.g., while processing operations 100, 102, and 104 of FIG. 7) and/or performing digital alignment operations (e.g., while processing operation 106 of FIG. 7), as shown by arrow 136 of FIG. 10, control circuitry 16 may ensure that image data 132 is properly aligned with image data 134. This may allow the user to perceive the image data across both eye boxes with satisfactory binocular vision.

Figure 11:
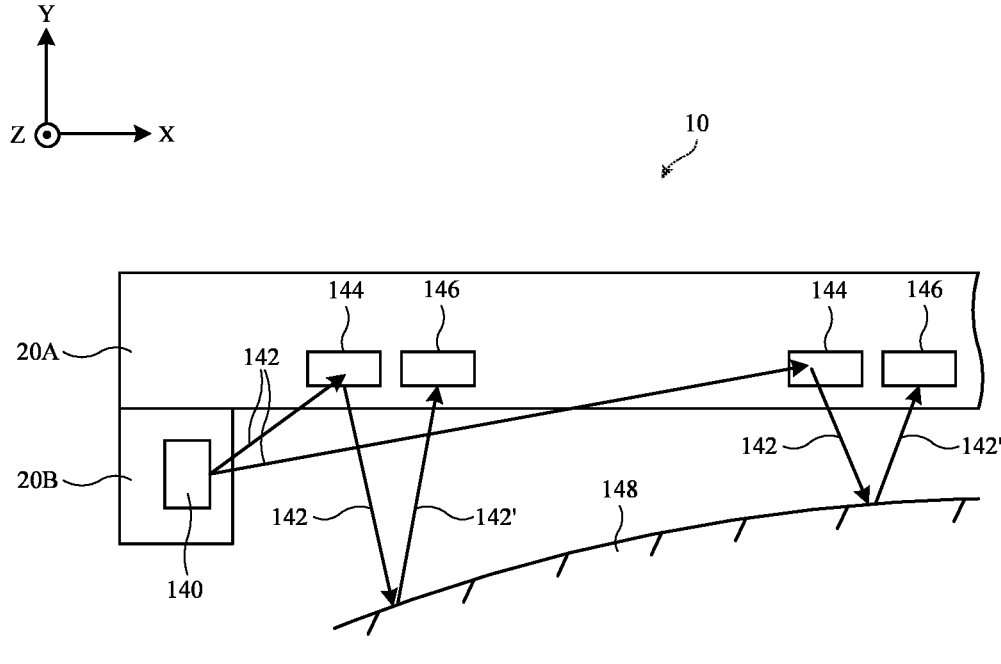
FIG. 11 is a top view of an illustrative display having light emitters, light sensors, and retro-reflective gratings for detecting optical misalignment in accordance with some embodiments.

If desired, system 10 may include optical emitters, optical sensors, and retro-reflective gratings for detecting the optical misalignment. FIG. 11 is a diagram showing how system 10 may include optical emitters, optical sensors, and retro-reflective gratings for detecting the optical misalignment. As shown in FIG. 11, system 10 may include a first housing portion 20A that includes a first waveguide for providing light to the first eye box (e.g., housing portion 20A may include waveguide 26B for providing light to eye box 24B of FIG. 8). System 10 may also include a second housing portion 20B (e.g., a left temple portion of the housing).

A light emitter 140 may be mounted within second housing portion 20B. Light emitter 140 may emit light 142 (e.g., light other than the image light to be provided to the eye box). Light 142 may be emitted at infrared or near-infrared wavelengths, as one example. Housing portion 20A may include one or more retro-reflective gratings such as retro-reflective gratings 144. Retro-reflective gratings 144 may be placed at different locations across housing portion 20A and may be separate from the gratings used to form couplers 28, 30, or 32 of FIG. 2. Retro-reflective gratings 144 may include surface relief gratings, thin film holograms, volume holograms, meta-gratings, or any other desired diffractive grating structures. Retro-reflective gratings 144 may be replaced with mirrors or other reflective structures if desired.

Retro-reflective gratings 144 may reflect light 142 towards the user's face (e.g., face 148). Light 142 may reflect off of face 148 as reflected light 142'. Housing portion 20A may include one or more optical sensors 146. Optical sensors 146 may include photo reflective sensors (e.g., single-pixel sensors that produce a voltage corresponding to the number of photons received), as one example. Optical sensors 146 may be placed at different locations across housing portion 20A. Optical sensors may receive reflected light 142' and may gather optical sensor data (e.g., voltage values) from reflected light 142'. Control circuitry 16 may process the optical sensor data to estimate the distance between housing portion 20A and face 148. Changes in this estimated distance over time may be indicative of optical misalignment or a change in optical misalignment that may be compensated for while processing step 98 of FIG. 7. The example of FIG. 11 is merely illustrative. There may be more than two retro-reflective gratings 144 and/or there may be more than two optical sensors 146 in housing portion 20A. Retro-reflective gratings 144 may also be used for performing gaze tracking operations if desired. While FIG. 11 only shows one side of system 10 (e.g., for the left side of the user's face), similar structures may also be provided on the other side of system 10 (e.g., for the right side of the user's face). Data captured by the optical sensors for each side may be compared to detect misalignment between the left and right eye boxes.

In accordance with an embodiment, a display system is provided that includes a waveguide; an input coupler on the waveguide and configured to couple image light into the waveguide; an output coupler on the waveguide and configured to couple the image light out of the waveguide; and a display module configured to produce the image light, the display module includes a display module housing, at least one light source within the display module housing, collimating optics mounted to the display module housing and having an optical axis, the collimating optics being configured to direct the image light towards the input coupler, and alignment structures configured to adjust a position of the optical axis relative to the waveguide.

In accordance with another embodiment, the alignment structures are configured to mechanically rotate the display module housing about an axis.

In accordance with another embodiment, the display module includes a lens housing, the collimating optics being mounted within the lens housing; and a set of piezo-driven flexure stages that couple the lens housing to the display module housing, the set of piezo-driven flexure stages are configured to mechanically translate the lens housing along a first axis relative to the display module housing.

In accordance with another embodiment, the display module includes an additional set of piezo-driven flexure stages that couple the lens housing to the display module housing, the additional set of piezo-driven flexure stages are configured to mechanically translate the lens housing along a second axis relative to the display module housing, the second axis being orthogonal to the first axis.

In accordance with another embodiment, the display module includes a reflective display panel mounted to the display module housing and configured to produce the image light by modulating illumination light emitted by the at least one light source using image data.

In accordance with another embodiment, the display module includes additional alignment structures configured to adjust a position of the reflective display panel with respect to the display module housing.

In accordance with another embodiment, the display module includes a reflective display panel mounted to the display module housing and configured to produce the image light by modulating illumination light emitted by the at least one light source using image data, the alignment structures are configured to adjust a position of the reflective display panel with respect to the display module housing.

In accordance with another embodiment, the display module includes a lens housing, the collimating optics are mounted within the lens housing, the alignment structures couple the lens housing to the display module housing, and the alignment structures are configured to mechanically translate a position of the lens housing relative to the display module housing along at least one axis.

In accordance with another embodiment, the display module includes a display panel mounted within the display panel housing and having pixels, the display panel is configured to produce the image light by modulating, using a subset of the pixels, illumination light produced by the at least one light source using image data, and the display system includes control circuitry configured to change the subset of pixels that are used by the display panel.

In accordance with another embodiment, the display system includes an additional waveguide; an additional input coupler on the additional waveguide and configured to couple additional image light into the additional waveguide; an additional output coupler on the additional waveguide and configured to couple the additional image light out of the additional waveguide; an additional display module configured to produce the additional image light; an optical alignment sensor configured to detect a position of the display module relative to the additional display module; and control circuitry configured to control the mechanical alignment structures to mechanically adjust the position of the optical axis with respect to the waveguide based on the position detected by the optical alignment sensor.

In accordance with another embodiment, the optical alignment sensor includes at least one image sensor configured to receive a portion of the image light from the waveguide and a portion of the additional image light from the additional waveguide.

In accordance with another embodiment, the output coupler is configured to pass the portion of the image light to a first additional output coupler on the waveguide, the first additional output coupler is configured to couple the portion of the image light out of the waveguide and towards the optical alignment sensor, the additional output coupler is configured to pass the portion of the additional image light to a second additional output coupler on the additional waveguide, and the second additional output coupler is configured to couple the portion of the additional image light out of the waveguide and towards the optical alignment sensor.

In accordance with another embodiment, the at least one image sensor includes first and second image sensors, the first image sensor is configured to receive the portion of the image light, and the second image sensor is configured to receive the portion of the additional image light.

In accordance with another embodiment, the at least one image sensor includes a single image sensor, the display system includes a first mirror; a second mirror; a third mirror; and a partially reflective beam splitter, the first mirror is configured to reflect the portion of the image light towards the second mirror, the second mirror is configured to reflect the portion of the image light towards the partially reflective beam splitter, the third mirror is configured to reflect the portion of the additional image light towards the partially reflective beam splitter, and the partially reflective beam splitter is configured to direct the portion of the image light and the additional portion of the image light towards the single image sensor.

In accordance with another embodiment, the optical alignment sensor includes a first light emitter configured to emit first infrared light; a first set of retro-reflective gratings on the waveguide and configured to diffract the first infrared light; a second light emitter configured to emit second infrared light; a second set of retro-reflective gratings on the additional waveguide and configured to diffract the second infrared light; a first set of photo reflective sensors on the first waveguide and configured to generate a first set of voltages based on a reflected version of the first infrared light diffracted by the first set of retro-reflective gratings; and a second set of photo reflective sensors on the second waveguide and configured to generate a second set of voltages based on a reflected version of the second infrared light diffracted by the second set of retro-reflective gratings, the control circuitry is configured to control the mechanical alignment structures to mechanically adjust the position of the optical axis with respect to the waveguide based on the first and second sets of voltages.

In accordance with an embodiment, a display system is provided that includes a first display module configured to produce first image light; a second display module configured to produce second image light; a first waveguide having first and second output couplers, the first output coupler is configured to couple a first portion of first image light out of the first waveguide; a second waveguide having third and fourth output couplers, the third output coupler is configured to couple a first portion of the second image light out of the second waveguide; a housing portion that couples the first waveguide to the second waveguide; at least one image sensor in the housing portion, the second output coupler is configured to couple a second portion of the first image light out of the first waveguide and towards the at least one image sensor in the housing portion, the fourth output coupler is configured to couple a second portion of the second image light out of the second waveguide and towards the at least one image sensor in the housing portion, and the at least one image sensor is configured to generate image sensor data based on the second portion of the first image light and the second portion of the second image light; and control circuitry configured to identify a position of the first image light relative to the second image light based on the image sensor data generated by the at least one image sensor.

In accordance with another embodiment, the control circuitry is configured to mechanically adjust the first display module to compensate for the identified optical misalignment.

In accordance with another embodiment, the control circuitry is configured to mechanically adjust the second display module to compensate for the identified optical misalignment.

In accordance with another embodiment, the control circuitry is configured to change a subset of pixels that are used by the first display module to produce the first image light to compensate for the identified optical misalignment.

In accordance with an embodiment, a display system is provided that includes a housing having first and second housing portions; a display module in the first housing portion and configured to produce image light, the display module has collimating optics configured to transmit the image light and the collimating optics have an optical axis; a waveguide in the second housing portion and configured to direct the image light; an infrared light emitter in the first housing portion and configured to emit infrared light; a set of retro-reflective gratings in the first housing portion and configured to reflect the infrared light; a set of optical sensors in the first housing portion and configured to produce voltages based on the reflected infrared light; and control circuitry configured to mechanically adjust an orientation of the optical axis based on the voltages produced by the set of optical sensors.

The foregoing is merely illustrative and various modifications can be made to the described embodiments. The foregoing embodiments may be implemented individually or in any combination.

What is claimed is:

1. A display system comprising:
a waveguide;
an input coupler on the waveguide and configured to couple image light into the waveguide;
an output coupler on the waveguide and configured to couple the image light out of the waveguide; and
a display module configured to produce the image light, the display module comprising:
  a display module housing,
  a display panel within the display module housing,
  collimating optics mounted to the display module housing and configured to direct the image light towards the input coupler,
  alignment structures configured to adjust a position of the display panel with respect to the collimating optics and to mechanically rotate the display module housing about an axis,
  a lens housing, the collimating optics being mounted within the lens housing, and
  a set of piezo-driven flexure stages that couples the lens housing to the display module housing, wherein the set of piezo-driven flexure stages is configured to mechanically translate the lens housing along a first axis relative to the display module housing.

2. The display system of claim 1, wherein the display module further comprises:
an additional set of piezo-driven flexure stages that couples the lens housing to the display module housing, wherein the additional set of piezo-driven flexure stages is configured to mechanically translate the lens housing along a second axis relative to the display module housing, the second axis being orthogonal to the first axis.

3. The display system of claim 1, wherein the display module further comprises:
at least one light source configured to emit illumination light, wherein the display panel is a reflective display panel configured to produce the image light by modulating the illumination using image data.

4. The display system of claim 1, wherein the display module further comprises:
at least one light source configured to emit illumination light, wherein the display panel has pixels, wherein the display panel is configured to produce the image light by modulating, using a subset of the pixels, the illumination light using image data, and wherein the display system comprises control circuitry configured to change the subset of pixels that are used by the display panel.

5. A display system comprising:
a waveguide;
an input coupler on the waveguide and configured to couple image light into the waveguide;

an output coupler on the waveguide and configured to couple the image light out of the waveguide;
a display module configured to produce the image light, the display module comprising:
  a display module housing,
  a display panel within the display module housing,
  collimating optics mounted to the display module housing and configured to direct the image light towards the input coupler, wherein the collimating optics have an optical axis, and
  alignment structures configured to adjust a position of the display panel with respect to the collimating optics;
an additional waveguide;
an additional input coupler on the additional waveguide and configured to couple additional image light into the additional waveguide;
an additional output coupler on the additional waveguide and configured to couple the additional image light out of the additional waveguide;
an additional display module configured to produce the additional image light;
an optical alignment sensor configured to detect a position of the display module relative to the additional display module; and
control circuitry configured to control the alignment structures to mechanically adjust the position of the optical axis with respect to the waveguide based on the position detected by the optical alignment sensor.

6. The display system of claim 5, wherein the optical alignment sensor comprises:
at least one image sensor configured to receive a portion of the image light from the waveguide and a portion of the additional image light from the additional waveguide.

7. The display system of claim 6, wherein the output coupler is configured to pass the portion of the image light to a first additional output coupler on the waveguide, the first additional output coupler is configured to couple the portion of the image light out of the waveguide and towards the optical alignment sensor, the additional output coupler is configured to pass the portion of the additional image light to a second additional output coupler on the additional waveguide, and the second additional output coupler is configured to couple the portion of the additional image light out of the waveguide and towards the optical alignment sensor.

8. The display system of claim 7, wherein the at least one image sensor comprises first and second image sensors, the first image sensor is configured to receive the portion of the image light, and the second image sensor is configured to receive the portion of the additional image light.

9. The display system of claim 7, wherein the at least one image sensor comprises a single image sensor, the display system further comprising:
a first mirror;
a second mirror;
a third mirror; and
a partially reflective beam splitter, wherein the first mirror is configured to reflect the portion of the image light towards the second mirror, the second mirror is configured to reflect the portion of the image light towards the partially reflective beam splitter, the third mirror is configured to reflect the portion of the additional image light towards the partially reflective beam splitter, and the partially reflective beam splitter is configured to direct the portion of the image light and the portion of the additional image light towards the single image sensor.

10. The display system of claim 5, wherein the optical alignment sensor comprises:

a first light emitter configured to emit first infrared light;

a first set of retro-reflective gratings on the waveguide and configured to diffract the first infrared light;

a second light emitter configured to emit second infrared light;

a second set of retro-reflective gratings on the additional waveguide and configured to diffract the second infrared light;

a first set of photo reflective sensors on the waveguide and configured to generate a first set of voltages based on a reflected version of the first infrared light diffracted by the first set of retro-reflective gratings; and a second set of photo reflective sensors on the additional waveguide and configured to generate a second set of voltages based on a reflected version of the second infrared light diffracted by the second set of retro-reflective gratings, wherein the control circuitry is configured to control the mechanical alignment structures to mechanically adjust the position of the optical axis with respect to the waveguide based on the first and second sets of voltages.

11. A display system comprising:

a waveguide;

an input coupler on the waveguide and configured to couple image light into the waveguide;

an output coupler on the waveguide and configured to couple the image light out of the waveguide; and a display module configured to produce the image light, the display module comprising:

a display module housing, a display panel within the display module housing, collimating optics mounted to the display module housing and configured to direct the image light towards the input coupler, a lens housing, wherein the collimating optics are mounted within the lens housing, and alignment structures that couple the lens housing to the display module housing, wherein the alignment structures are configured to adjust a position of the display panel with respect to the collimating optics and to mechanically translate a position of the lens housing relative to the display module housing along at least one axis.

\* \* \* \* \*